A. J. HOFFMAN.
Baking-Pans.

No. 196,453. Patented Oct. 23, 1877.

Attest:
Jno. R. Brooks.
August Petersohn.

Inventor:
Alice J. Hoffman
by Louis Bagger & Co.
Attys.

UNITED STATES PATENT OFFICE.

ALICE J. HOFFMAN, OF RICHMOND, INDIANA.

IMPROVEMENT IN BAKING-PANS.

Specification forming part of Letters Patent No. 196,453, dated October 23, 1877; application filed July 18, 1877.

*To all whom it may concern:*

Be it known that I, ALICE J. HOFFMAN, of Richmond, in the county of Wayne and State of Indiana, have invented certain new and useful Improvements in Baking-Pans; and I do hereby declare that the following is a full, clear, and exact description thereof, which will enable others skilled in the art to which it appertains to make and use the same, reference being had to the accompanying drawing, which forms a part of this specification, and in which—

Figure 1:
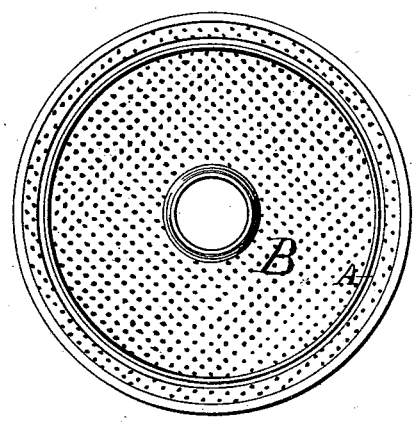
Figure 2:
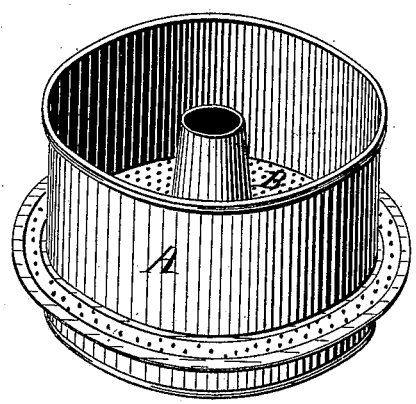
Figure 3:
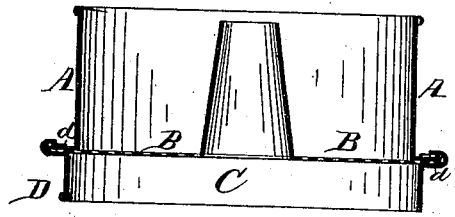

Figure 1 is a top plan. Fig. 2 is a perspective view, and Fig. 3 is a vertical section.

Similar letters of reference indicate corresponding parts in all the figures.

This invention relates to pans for baking bread, cake, &c.; and it consists in the construction of such pans with a perforated bottom and a hot-air chamber of a diameter in excess to that of the pan proper, substantially as hereinafter more fully described, and pointed out in the claim.

In the drawing, A is the body of the pan, made of sheet metal, and B is the bottom. I have shown this to consist of a piece of perforated sheet metal; but it may be made of wire-cloth or similar material without changing the spirit of my invention. C is the hot-air chamber, which is formed by the rim D, projecting flange d, and perforated bottom B.

When it is desired to use my improved baking-pan, a piece of tissue or other thin paper is first placed in the bottom, to prevent the dough from sticking, or (when thin batter is used) prevent it from running through the perforations in the bottom. The pan is then filled with dough in the usual manner, and placed in the oven, when the air in chamber C, becoming heated, will rise through the perforated bottom up through the dough, causing this to bake quickly and evenly. By extending the flange d and rim D, which, with the bottom B, form the hot-air chamber, beyond the walls or sides of the pan A, a larger area of heating-surface is utilized than otherwise, because the columns of hot air, which, if the rim D were even or flush with the sides A, would ascend up from the heating-surface alongside of the outside of the pan, are, as it were, drawn in under it, and sent up through the perforated bottom, thereby greatly accelerating the process of baking.

Having thus described my invention, I claim and desire to secure by Letters Patent of the United States—

The improved baking-pan herein described, consisting of a body, A, of any suitable size and shape, a perforated elevated bottom, B, annular flange or shoulder d, and rim D, whereby a hot-air chamber or reservoir, C, is formed, substantially as and for the purpose herein shown and specified.

In testimony that I claim the foregoing as my own I have hereto affixed my signature in presence of two witnesses.

ALICE J. HOFFMAN.

Witnesses:
ROBERT W. CARTER,
JOHN JURGENS.